US012619040B2

(12) United States Patent
Nguyen et al.

(10) Patent No.: US 12,619,040 B2
(45) Date of Patent: May 5, 2026

(54) OPTICAL FIBER MODULE

(71) Applicant: SUMITOMO ELECTRIC INDUSTRIES, LTD., Osaka (JP)

(72) Inventors: Hong Chuyen Nguyen, Osaka (JP); Tetsuya Nakanishi, Osaka (JP); Takayuki Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 269 days.

(21) Appl. No.: 18/580,337

(22) PCT Filed: Aug. 10, 2022

(86) PCT No.: PCT/JP2022/030642
§ 371 (c)(1),
(2) Date: Jan. 18, 2024

(87) PCT Pub. No.: WO2023/037819
PCT Pub. Date: Mar. 16, 2023

(65) Prior Publication Data
US 2024/0319459 A1     Sep. 26, 2024

(30) Foreign Application Priority Data

Sep. 10, 2021     (JP) ................................. 2021-147493

(51) Int. Cl.
*G02B 6/42*          (2006.01)
*G02B 6/43*          (2006.01)
(52) U.S. Cl.
CPC ......... *G02B 6/4292* (2013.01); *G02B 6/4278* (2013.01); *G02B 6/4218* (2013.01); *G02B 6/4284* (2013.01); *G02B 6/43* (2013.01)

(58) Field of Classification Search
None
See application file for complete search history.

(56) References Cited

U.S. PATENT DOCUMENTS 10,826,613 B1    11/2020  Liang et al.
11,360,276 B1 *   6/2022  Blackburn  ........... G02B 6/0083
(Continued)

FOREIGN PATENT DOCUMENTS

JP       2012-530944 A    12/2012
WO       2010/148336 A1   12/2010

OTHER PUBLICATIONS

Brian Welch. "Co-Packaged Optics Integration". Jun. 8, 2020.

*Primary Examiner* — Jerry Rahll
(74) *Attorney, Agent, or Firm* — OLIFF PLC

(57)                ABSTRACT

An optical fiber module is attached to and detached from a host device having an optical engine and an internal optical connector optically connected to the optical engine. The optical fiber module includes a housing having a first surface exposed in a state of being attached to the host device and a second surface facing the first surface; at least one first optical connector provided on the first surface; and a second optical connector provided on the second surface and capable of being optically connected to the internal optical connector. Furthermore, the optical fiber module includes: a first optical fiber optically connecting the first optical connector and the second optical connector to each other; and a light source module supplying light to the optical engine via the second optical connector.

7 Claims, 6 Drawing Sheets

(56)        References Cited

U.S. PATENT DOCUMENTS

2010/0027953  A1        2/2010   Russell
2010/0322583  A1*     12/2010   Cooke .................. G02B 6/4453
                                                              385/135
2013/0004120  A1*       1/2013   Zbinden ............... G02B 6/4232
                                                              385/14
2013/0308915  A1*     11/2013   Buff ..................... G02B 6/2804
                                                              385/134
2014/0105612  A1        4/2014   Wu et al.
2018/0212699  A1*       7/2018   Salsi .................... H04B 10/503
2021/0044356  A1*       2/2021   Aboagye ............. H04B 10/503
2021/0325617  A1*     10/2021   Zheng ................. G02B 6/4284

* cited by examiner

OPTICAL FIBER MODULE

TECHNICAL FIELD

The present disclosure relates to optical fiber modules.

This application claims priority based on Japanese Application No. 2021-147493 dated Sep. 10, 2021, the entire contents of which are incorporated herein by reference.

BACKGROUND ART

Non Patent Literature 1 describes a server. The server includes an optical engine mounted on an electronic circuit board, a plurality of optical fiber cables extending from the optical engine, a plurality of optical connectors, and a housing. The plurality of optical connectors are provided at the end of each optical fiber cable on the opposite side of the optical engine. The housing houses the optical engine and the optical fiber cable. The optical engine converts electrical signals into optical signals. Each of the plurality of optical fiber cables propagates the optical signal converted by the optical engine. The optical connector is attached to a panel constituting the side surface of the housing.

CITATION LIST

Non Patent Literature

Non Patent Literature 1: Brian Welch, Cisco "Co-Packaged Optics Integration" Internet <https://epic-assoc.com/wp-content/uploads/2021/06/Brian-Welch_Cisco.pdf>

SUMMARY OF INVENTION

An optical fiber module according to the present disclosure is an optical fiber module attached to and detached from a host device having an optical engine and an internal optical connector optically connected to the optical engine. The optical fiber module includes: a housing having a first surface exposed in a state of being attached to the host device and a second surface facing the first surface; at least one first optical connector provided on the first surface; and a second optical connector provided on the second surface and capable of being optically connected to the internal optical connector. Furthermore, the optical fiber module includes: a first optical fiber optically connecting the first optical connector and the second optical connector to each other; and a light source module supplying light to the optical engine via the second optical connector.

DESCRIPTION OF EMBODIMENTS

Figure 1:
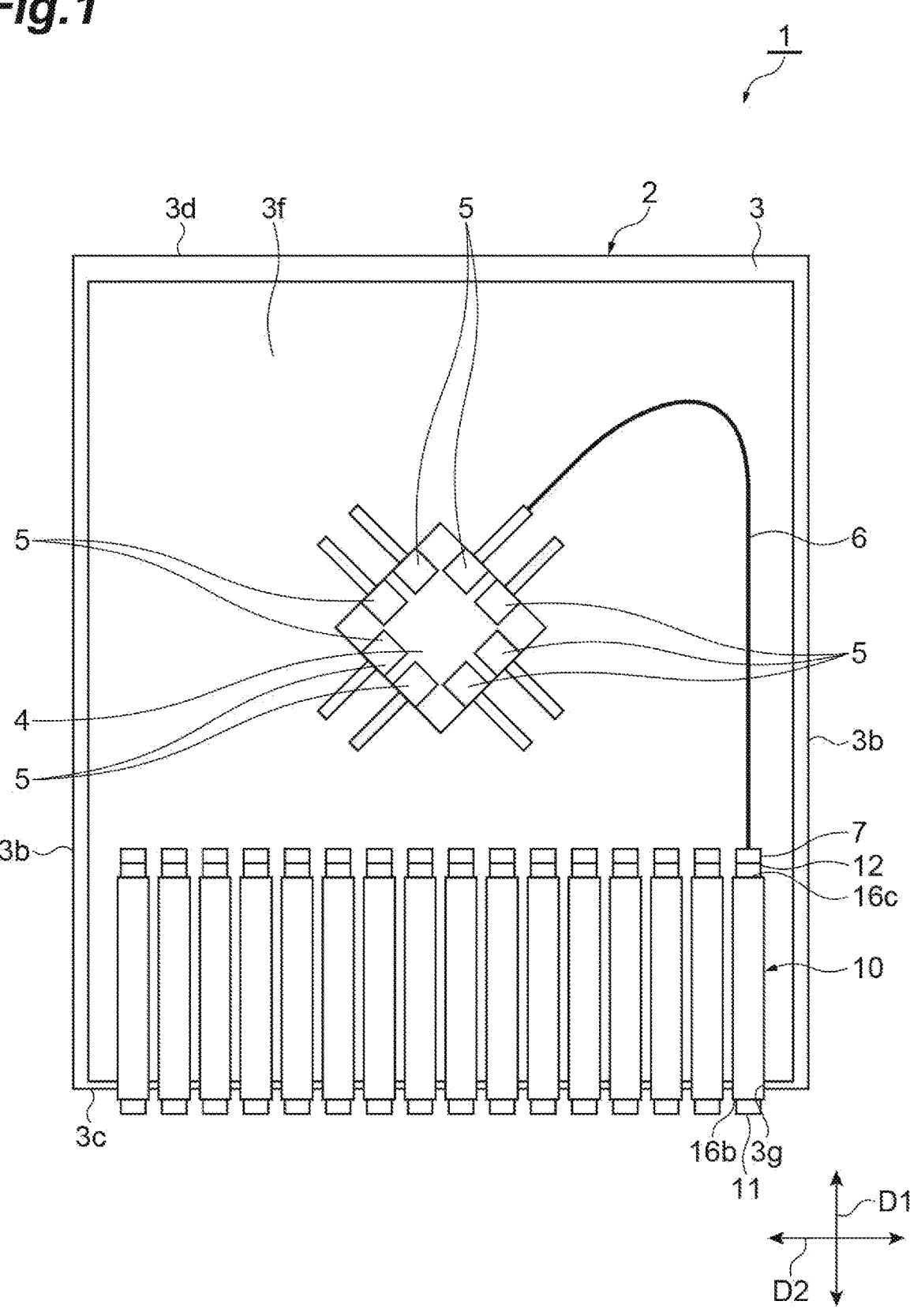
FIG. 1 is a plan view schematically illustrating an optical device including an optical fiber module and a host device according to an embodiment.

Each of the plurality of optical fiber cables extending from the optical engine is connected to each of the plurality of optical connectors. When the number of optical fiber cables and the number of optical connectors are large, identifying and wiring the optical fiber cables can be difficult. That is, the work of connecting each of the plurality of optical connectors to each of the plurality of optical fiber cables may become complicated.

An object of the present disclosure is to provide an optical fiber module that can easily perform a work of connecting optical connectors.

DESCRIPTION OF EMBODIMENTS OF PRESENT INVENTION

First, contents of an embodiment of the present disclosure will be listed and described. An optical fiber module according to an embodiment is an optical fiber module attached to and detached from a host device including (1) an optical engine and an internal optical connector optically connected to the optical engine. The optical fiber module includes: a housing having a first surface exposed in a state of being attached to the host device and a second surface facing the first surface; at least one first optical connector provided on the first surface; and a second optical connector provided on the second surface and capable of being optically connected to the internal optical connector. Furthermore, the optical fiber module includes: a first optical fiber optically connecting the first optical connector and the second optical connector to each other; and a light source module supplying light to the optical engine via the second optical connector.

When the optical fiber module is attached to the host device, the second optical connector optically connects to the internal optical connector. By attaching the optical fiber module to the host device, the first optical connector and the second optical connector of the optical fiber module can be optically connected to the internal optical connector. Therefore, the work of connecting the optical connectors can be easily performed.

(2) In (1) above, the optical fiber module may include an electrical board electrically connected to the host device, and the light source module may receive power from the electrical board and supply light. In this case, the light source module can receive power from the host device via the electrical board.

(3) In (1) or (2) above, the fiber module may include a second optical fiber optically connecting the light source module and the second optical connector to each other. In this case, the light source module can supply light to the optical engine via the second optical fiber and the second optical connector.

(4) In (3) above, the second optical fiber may include at least one polarization maintaining fiber. In this case, since the light of which polarization state is maintained can be input to the optical engine, the loss of light to the optical engine can be reduced.

(5) In any one of (1) to (4) above, the optical fiber module may include an optical multiplexer/demultiplexer multiplexing and demultiplexing the light passing through the first optical fiber. In this case, light can be multiplexed and demultiplexed in the optical fiber module.

(6) In any one of (1) to (5) above, the optical fiber module may include a plurality of first optical connectors.

Details of Embodiments of Present Disclosure

A specific example of the optical fiber module according to the embodiment will be described below with reference to the drawings. The present invention is not limited to the following examples, but is indicated in the claims, and is intended to include all changes within the scope equivalent to the claims. In the description of the drawings, the same or corresponding elements are denoted by the same reference numerals, and redundant description will be omitted as appropriate. For ease of understanding, some portions of the drawings may be simplified or exaggerated, and the dimensional ratios and the like are not limited to those illustrated in the drawings.

FIG. 1 is a plan view schematically illustrating an optical device 1 including an optical fiber module 10 and a host device 2 as an example. As illustrated in FIG. 1, the host device 2 includes a housing 3, a semiconductor package 4, and an optical engine 5. The housing 3 has, for example, a rectangular shape. The housing 3 has a pair of side surfaces 3b, a front surface 3c, a rear surface 3d, and a bottom surface 3f. The pair of side surfaces 3b extend in a first direction D1 and are aligned along a second direction D2 intersecting the first direction D1. The optical fiber module 10 is attached to the front surface 3c. The rear surface 3d faces the opposite side of the front surface 3c. The bottom surface 3f extends in both the first direction D1 and the second direction D2. For example, the first direction D1 is a longitudinal direction of the housing 3, and the second direction D2 is a width direction of the housing 3.

Figure 2:
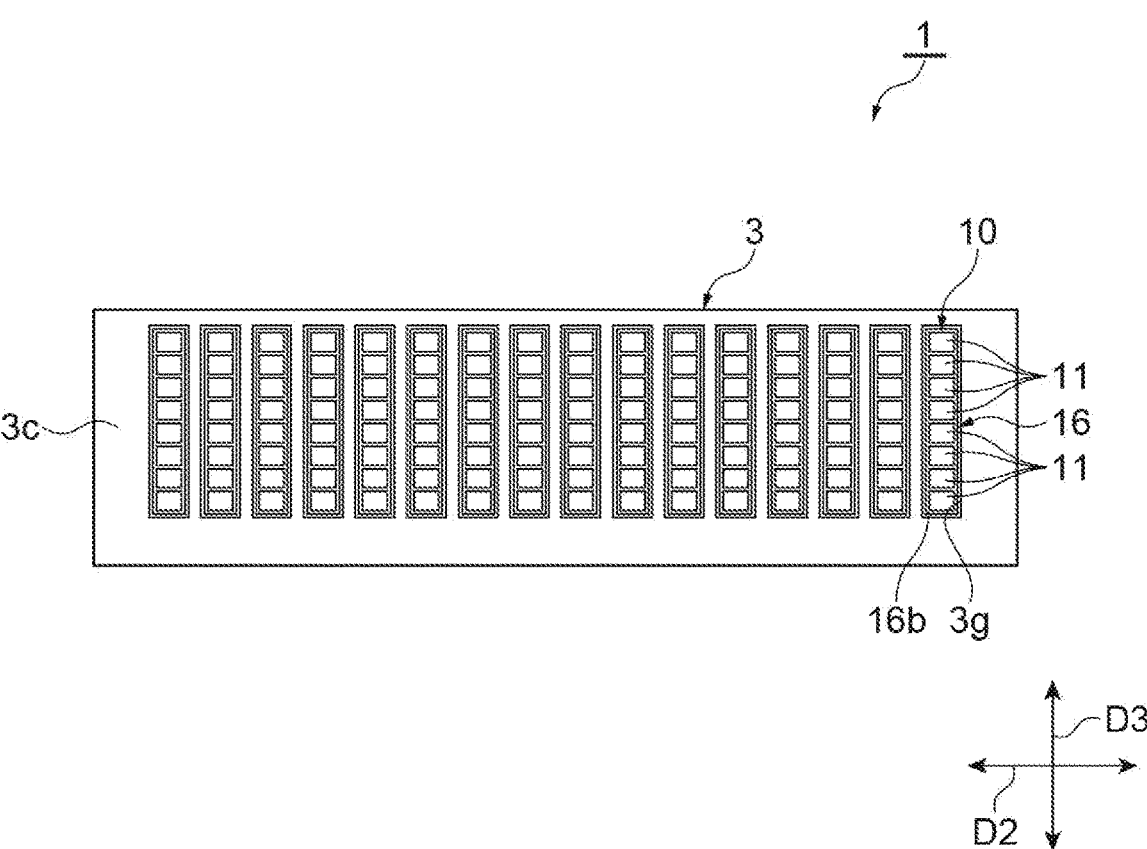
FIG. 2 is a side view illustrating the optical fiber module and the host device according to the embodiment.
Figure 3:
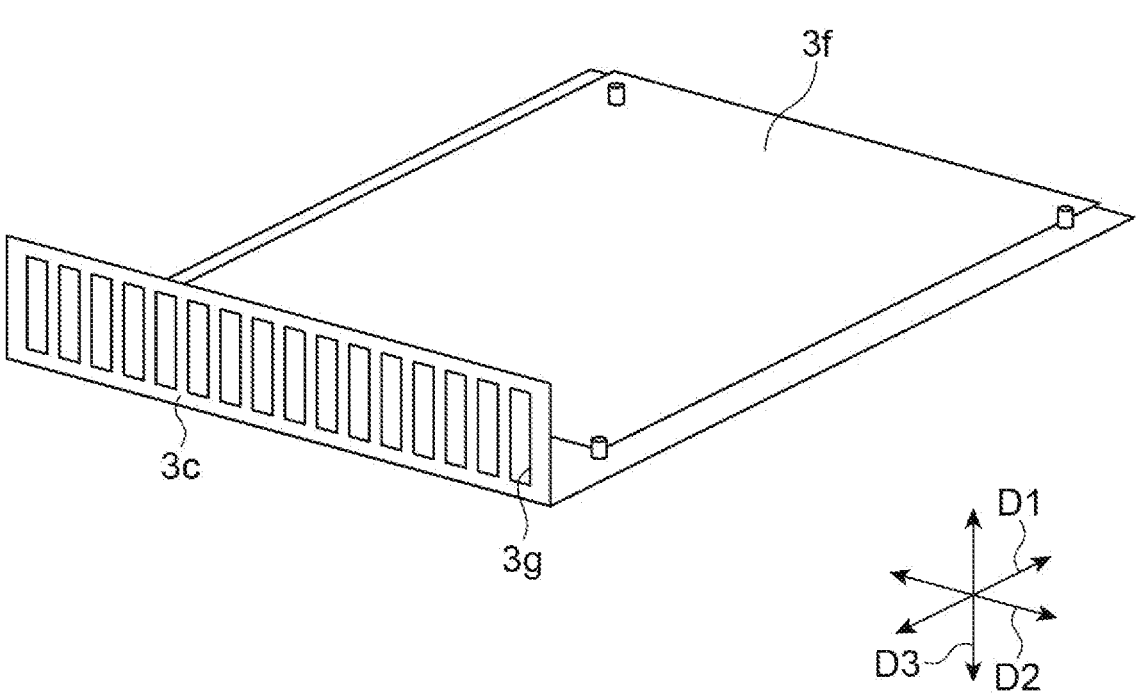
FIG. 3 is a perspective view schematically illustrating the host device to which the optical fiber module according to the embodiment is attached.

FIG. 2 is a front view of the optical device 1 illustrating the front surface 3c of the housing 3. FIG. 3 is a perspective view illustrating the front surface 3c and the bottom surface 3f. As illustrated in FIGS. 1, 2, and 3, each of the front surface 3c and the rear surface 3d extends in both the second direction D2 and a third direction D3. The third direction D3 is a direction intersecting both the first direction D1 and the second direction D2. For example, the first direction D1, the second direction D2, and the third direction D3 are orthogonal to each other.

The front surface 3c has a hole 3g into which the optical fiber module 10 is attached. The hole 3g has, for example, a rectangular shape with a long side extending in the third direction D3. The housing 3 has a plurality of the holes 3g, and the plurality of holes 3g are aligned along the second direction D2. The number of holes 3g and the number of optical fiber modules 10 is, as an example, 16. However, the number of holes 3g and the number of optical fiber modules 10 are not particularly limited.

For example, an electronic circuit is provided on the bottom surface 3f, and the semiconductor package 4 is mounted on the electronic circuit. The semiconductor package 4 has a plurality of the optical engines 5. The optical engine 5 photoelectrically converts an optical signal into an electrical signal. The semiconductor package 4 performs signal processing on the electrical signal converted by the optical engine 5. The host device 2 includes a plurality of the optical engines 5. Each of the plurality of optical engines 5 is optically connected to the optical fiber module 10.

The host device 2 includes an internal fiber 6 extending from the optical engine 5 and an internal optical connector 7 located at the end of the internal fiber 6 on the opposite side of the optical engine 5. The host device 2 includes a plurality of the optical engines 5 and a plurality of the internal fibers 6. Each of the plurality of internal fibers 6 is connected to each of the plurality of optical fiber modules 10. In FIG. 1, one internal fiber 6 is illustrated for simplicity. The internal fiber 6 is, for example, a single-core fiber. However, the internal fiber 6 may be a multi-core fiber, and the type of the internal fiber 6 is not particularly limited.

Figure 4:
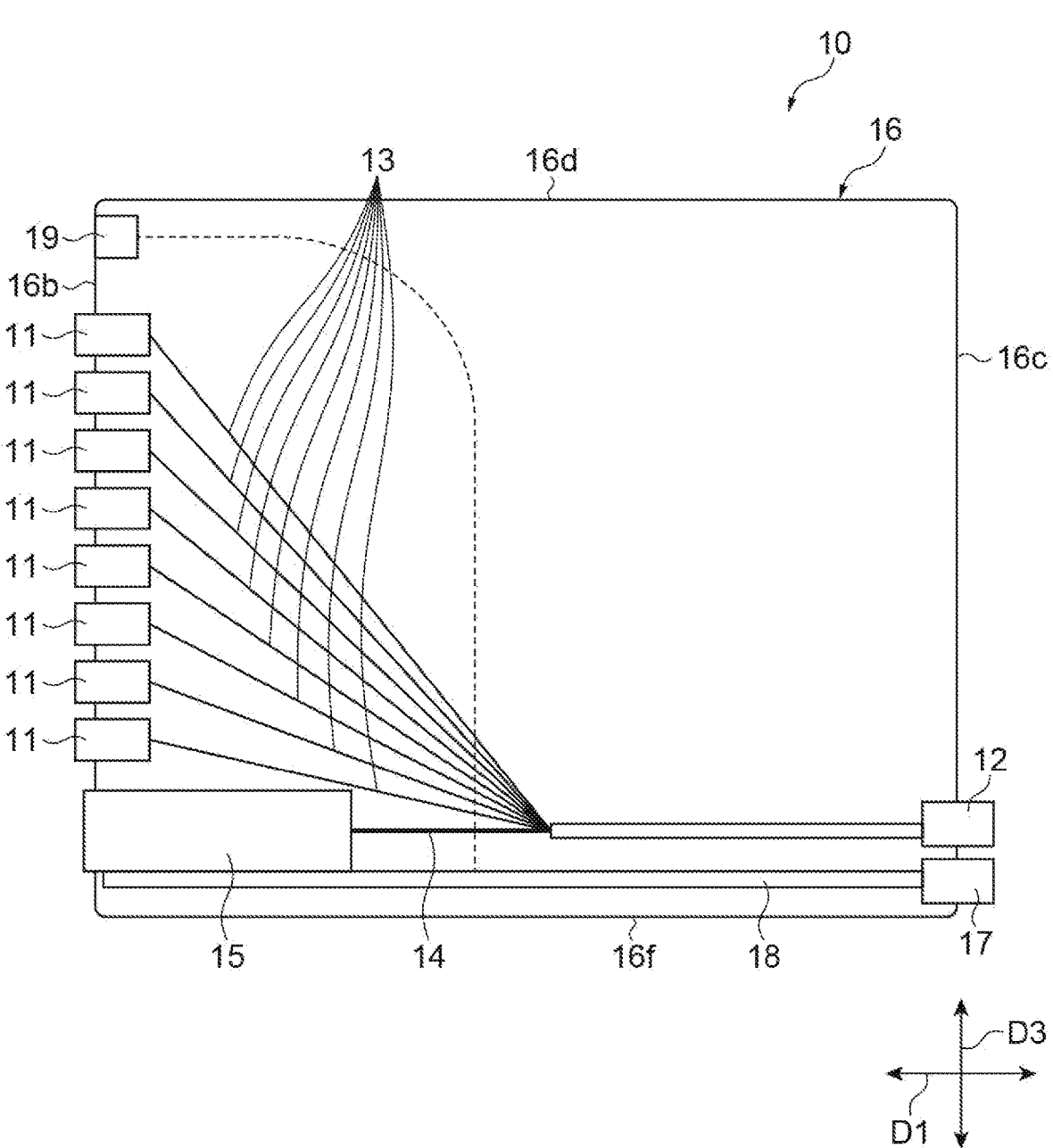
FIG. 4 is a diagram illustrating an internal structure of the optical fiber module according to the embodiment.
Figure 5:
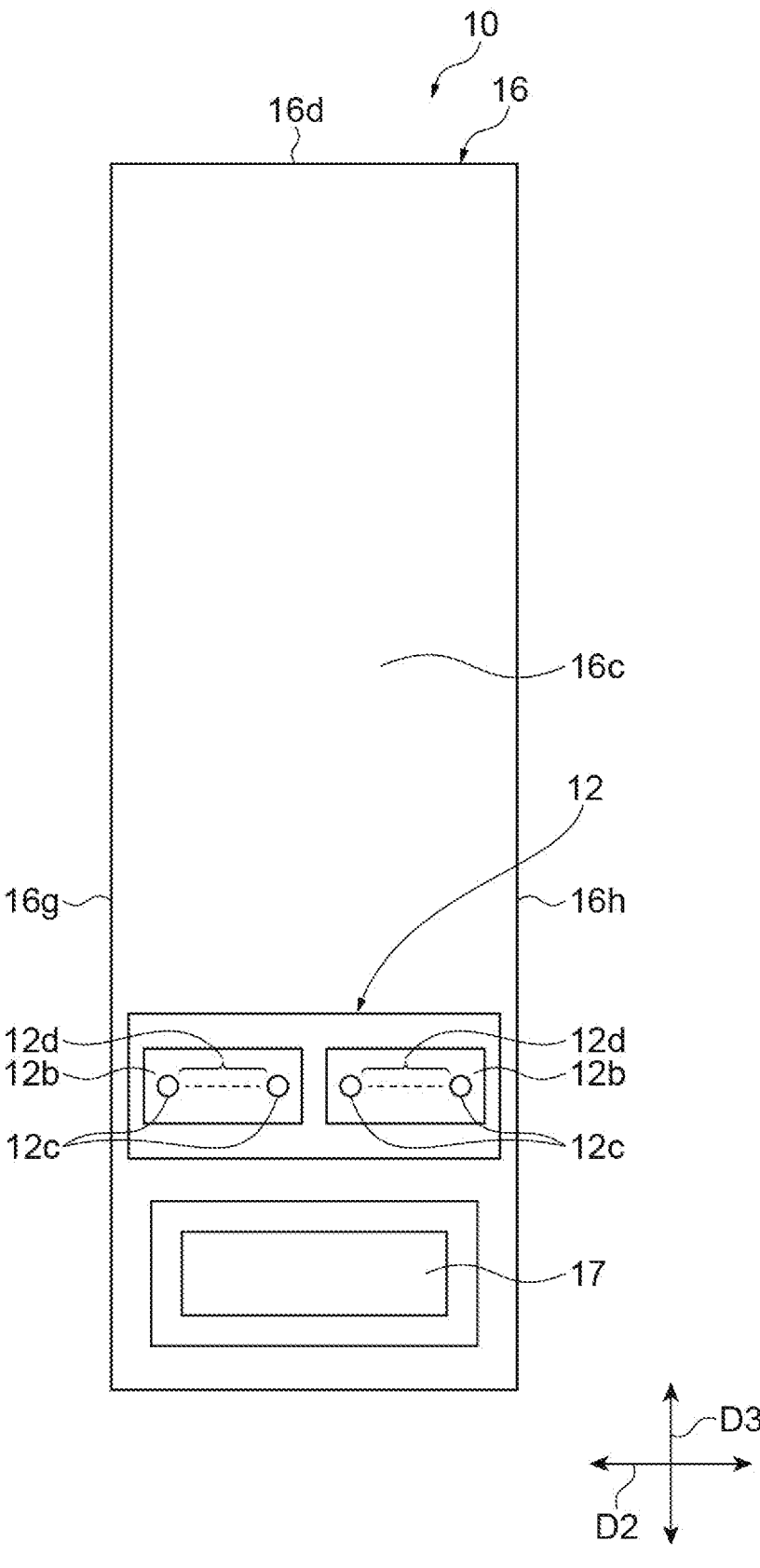
FIG. 5 is a rear view illustrating the optical fiber module according to the embodiment.

For example, the plurality of optical fiber modules 10 are arranged so as to be aligned along the second direction D2. As an example, 16 optical fiber modules 10 are arranged so as to be aligned along the second direction D2. FIG. 4 is a diagram schematically illustrating the internal structure of the optical fiber module 10. FIG. 5 is a diagram illustrating the side surface of the optical fiber module 10. As illustrated in FIGS. 4 and 5, the optical fiber module 10 includes a first optical connector 11, a second optical connector 12, a first optical fiber 13, a second optical fiber 14, a light source module 15, and a housing 16.

For example, the housing 16 has a rectangular parallel-epiped shape. The housing 16 has a first surface 16b and a second surface 16c facing the first surface 16b. For example, the housing 16 has a first surface 16b, a second surface 16c, a third surface 16d, a fourth surface 16f, a fifth surface 16g, and a sixth surface 16h. The first surface 16b is a surface exposed to the outside of the optical device 1 when the optical fiber module 10 is attached to the host device 2. The second surface 16c is a surface that enters the inside of the housing 3 when the optical fiber module 10 is attached to the host device 2. The first surface 16b and the second surface 16c extend in both the second direction D2 and the third direction D3.

The optical fiber module 10 includes, for example, an indicator lamp 19. The indicator lamp 19 receives power supply from the host device 2. The indicator lamp 19 displays the operating state of the equipment (for example, the semiconductor package 4 or the optical engine 5) inside the host device 2. The optical fiber module 10 includes a plurality of first optical connectors 11. For example, the plurality of first optical connectors 11 are arranged so as to be aligned on the first surface 16b.

An external connector is connected to each of the plurality of first optical connectors 11. The external connector transmits and receives optical signals to and from the optical engine 5 via, for example, the first optical connector 11, the first optical fiber 13, the second optical connector 12, the internal optical connector 7, and the internal fiber 6. As an example, the number of first optical connectors 11 is 8. In this case, for example, each of the 16 optical fiber modules 10 includes 8 first optical connectors 11. Therefore, a maximum of 128 external connectors can be connected to the host device 2. The number of second optical connectors 12 is less than or equal to the number of first optical connectors 11.

The light source module 15 supplies light to the optical engine 5 via the second optical connector 12. The light output by the light source module 15 is, for example, a continuous wave laser (CW) light. The light source module 15 protrudes to the outside of the housing 16 from the first surface 16b. As an example, the indicator lamp 19, the plurality of first optical connectors 11, and the light source module 15 are aligned in this order along the third direction D3. The light source module 15 may be, for example, an optical transceiver detachable from the housing 16. In this case, the light source module 15 can be inserted or removed from the housing 16 along the first direction D1. However, the light source module 15 may not be an optical transceiver. In this case, the light source module 15 may not protrude to the outside of the housing 16 from the first surface 16b.

The optical fiber module 10 includes a plurality of first optical fibers 13. Each of the plurality of first optical fibers 13 extends into the interior of the housing 16 from each of the plurality of first optical connectors 11. For example, the number of first optical fibers 13 is the same as the number of internal fibers 6. The second optical fiber 14 extends from the light source module 15 into the interior of the housing 16. For example, the plurality of first optical fibers 13 and one second optical fiber 14 are bundled inside the housing 16. The bundled first optical fiber 13 and second optical fiber 14 are connected to the second optical connector 12. The first optical connector 11 and the second optical connector 12 are optically connected to each other via the first optical fiber 13. The light source module 15 and the second optical connector 12 are optically connected to each other via the second optical fiber 14.

The optical fiber module 10 includes, for example, an electrical connector 17 electrically connected to the host device 2, and an electrical board 18 extending from the electrical connector 17 along the first direction D1. The second optical connector 12 and the electrical connector 17 are arranged so as to be aligned along the third direction D3. The second optical connector 12 and the electrical connector 17, for example, protrude to the outside of the housing 16 from the second surface 16c. For example, when the optical fiber module 10 is attached to the host device 2, the second optical connector 12 is optically connected to the internal optical connector 7, and the electrical connector 17 is electrically connected to the internal electrical connector (not illustrated) of the host device 2.

The second optical connector 12 includes, for example, a ferrule 12b and a guide portion 12c. The ferrule 12b has an end surface extending in both the second direction D2 and the third direction D3. Tip surfaces 12d of the plurality of first optical fibers 13 and the plurality of second optical fibers 14 are exposed on the end surface. The guide portion 12c may be a guide hole formed in the ferrule 12b into which a guide pin of the internal optical connector 7 is fitted, or may be a guide pin that is inserted into the guide hole of the internal optical connector 7. As an example, the second optical connector 12 has a plurality of the ferrules 12b. The plurality of ferrules 12b are arranged so as to be aligned along the second direction D2. A plurality of tip surfaces 12d are aligned along the second direction D2 between a pair of guide portions 12c.

The electrical board 18 receives power supply from the host device 2 via the electrical connector 17. For example, the light source module 15 is mounted on the electrical board 18. The light source module 15 receives power supply from the electrical board 18 and outputs light. The light output from the light source module 15 is supplied to the optical engine 5 via, for example, the second optical fiber 14, the second optical connector 12, the internal optical connector 7, and the internal fiber 6. Since the light source module 15 supplies light to the optical engine 5, the light emitting function of the optical engine 5 itself can be made unnecessary.

For example, the second optical fiber 14 is a polarization maintaining fiber (PMF). The optical fiber module 10 may include the plurality of second optical fibers 14. At least one of the plurality of second optical fibers 14 may be a polarization maintaining fiber. The internal fiber 6 optically connected to the second optical fiber 14 may be the polarization maintaining fiber. In this case, light of which polarization state is maintained is input to the optical engine 5 via the second optical fiber 14 and the internal fiber 6. The indicator lamp 19 is electrically connected to electrical board 18. The indicator lamp 19 receives power supply from the electrical board 18 and emits light.

When the optical fiber module 10 configured as described above is attached to the host device 2, the second optical connector 12 is optically connected to the internal optical connector 7. By attaching the optical fiber module 10 to the host device 2, the first optical connector 11 and the second optical connector 12 of the optical fiber module 10 can be optically connected to the internal optical connector 7. By inserting the optical fiber module 10 into the housing 3 of the host device 2, since the optical fiber module 10 can be easily connected to the components of the host device 2 (semiconductor package 4, optical engine 5, and the like), the work of connecting the optical connectors can be easily performed.

Figure 6:
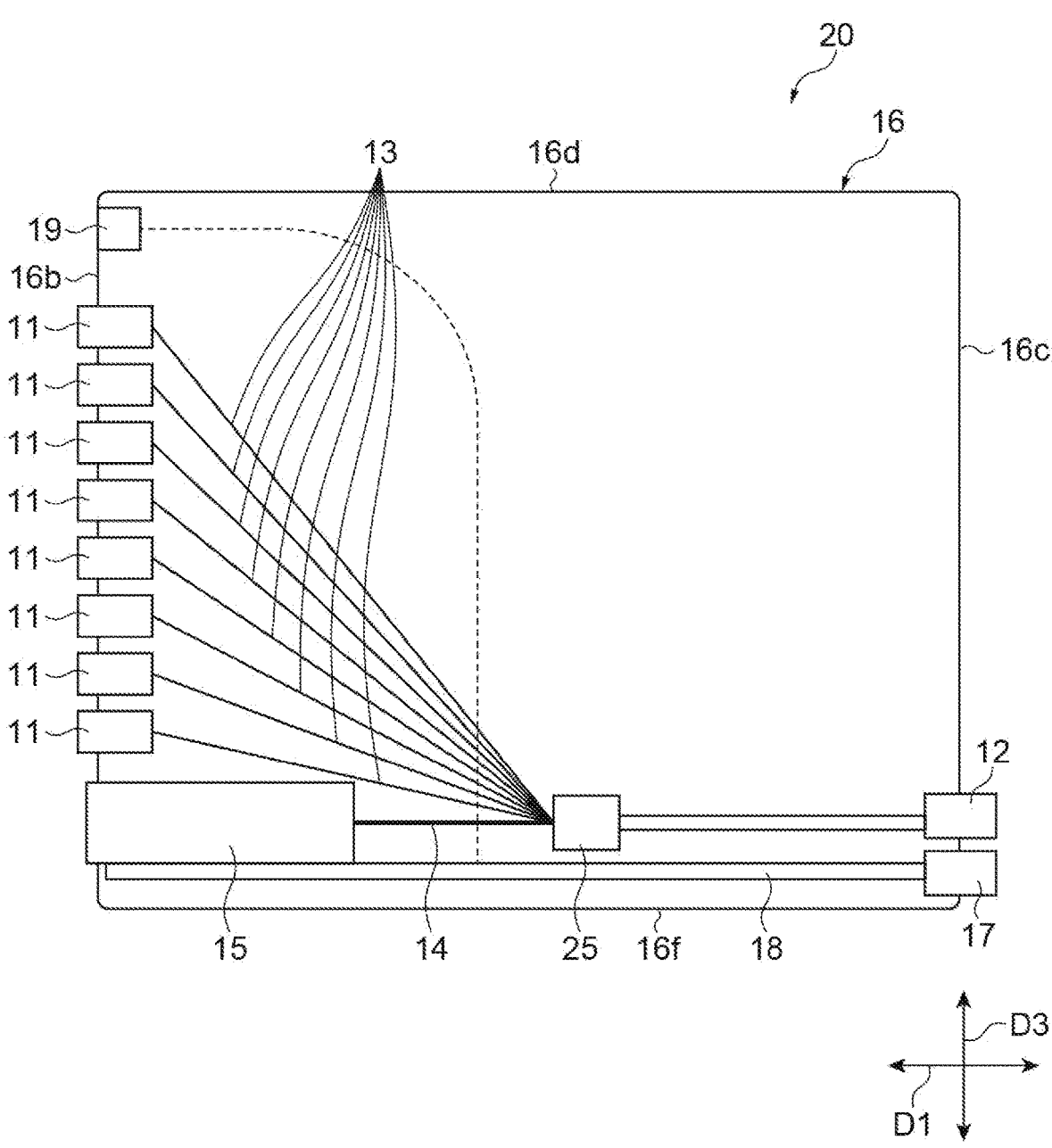
FIG. 6 is a diagram illustrating an internal structure of an optical fiber module according to a modified example.

Next, a modified example of the optical fiber module according to the present disclosure will be described with reference to FIG. 6. FIG. 6 is a diagram schematically illustrating the internal structure of an optical fiber module 20 according to a modified example. A portion of the configuration of the optical fiber module 20 overlaps with a portion of the configuration of the optical fiber module 10 described above. Therefore, hereinafter, description overlapping with those of the optical fiber module 10 will be denoted by the same reference numerals and omitted as appropriate.

The optical fiber module 20 includes an optical multiplexer/demultiplexer 25 inside the housing 16. The optical multiplexer/demultiplexer 25 is optically connected to each of the first optical connector 11 and the second optical connector 12. The optical multiplexer/demultiplexer 25 is provided, for example, in the middle of the first optical fiber 13. The optical multiplexer/demultiplexer 25 may be provided integrally with the first optical connector 11. For example, the second optical fiber 14 is passed through the interior of the optical multiplexer/demultiplexer 25. However, the second optical fiber 14 does not need to be passed through the interior of the optical multiplexer/demultiplexer 25. The second optical fiber 14 may be arranged so as to bypass the optical multiplexer/demultiplexer 25.

The optical multiplexer/demultiplexer 25, for example, demultiplexes the light from the first optical connector 11 and outputs the light to the second optical connector 12. In this case, the optical multiplexer/demultiplexer 25 separates the wavelength multiplexed optical signal received from the first optical connector 11 and outputs the separated optical signal to the second optical connector 12. For example, the optical multiplexer/demultiplexer 25 multiplexes the light from the second optical connector 12 and outputs the multiplexed light to the first optical connector 11. In this case, a plurality of the optical signals received from the second optical connector 12 are multiplexed, and the multiplexed optical signal is output to the first optical connector 11.

The optical fiber module 20 has the optical multiplexer/demultiplexer 25 built therein. In the optical device 1 handling wavelength-multiplexed optical signals, since the optical fiber module 20 is provided with the optical multiplexer/demultiplexer 25, arrangement of the optical multiplexer/demultiplexer in the host device 2 can be made unnecessary. Therefore, the configuration of the host device 2 can be simplified.

Heretofore, the embodiments and modified examples of the optical fiber module according to the present disclosure have been described above. However, the optical fiber module according to the present disclosure is not limited to the embodiments or modified examples described above, and can be modified as appropriate within the scope of the spirit described in the claims. For example, in the embodiment described above, the example in which 16 optical fiber modules 10 are arranged and the example in which 8 first optical connectors 11 are arranged have been described. However, the number of optical fiber modules and the number of first optical connectors are not particularly limited. The number of first optical connectors may be singular or plural. In the embodiment described above, the plurality of first optical connectors 11 aligned along the third direction D3 have been described. However, for example, the first optical connectors may be aligned in each of the second direction D2 and the third direction D3, and there is no particular limitation on the manner in which the first optical connectors are arranged.

In the embodiments described above, the example in which the optical fiber module 10 includes the electrical connector 17 and the electrical board 18 has been described. However, the optical fiber module may be an optical fiber module that does not include at least one of the electrical connector 17 and the electrical board 18. For example, instead of the electrical connector 17, a portion of the electrical board 18 may protrude from the second surface 16c, and the portion of the electrical board 18 protruding from the second surface 16c may function as an electrical plug. The light source module 15 may be directly electrically connected to the electrical connector 17. Furthermore, the electrical board of the light source module 15 may be directly electrically connected to the internal electrical connector of the host device 2.

In the embodiment described above, the example in which the light source module 15 is optically connected to the second optical connector 12 via the second optical fiber 14 has been described. However, the light source module 15 may be directly optically connected to the second optical connector 12 without through the second optical fiber 14. In this case, the second optical fiber 14 can be made unnecessary.

In the embodiment described above, the example in which the plurality of optical engines 5 are mounted on the semiconductor package 4 has been described. However, only one optical engine 5 may be mounted on the semiconductor package 4. The host device 2 may include a plurality of the semiconductor packages 4. In the embodiment described above, the example in which one optical fiber module 10 is attached to the hole 3g has been described. However, a plurality of the optical fiber modules 10 may be attached to one hole 3g.

In the embodiment described above, the example in which the second optical connector 12 mounted on the optical fiber module 10 has the guide portion 12c in the ferrule 12b has been described. However, apart from this guide portion 12c, another guide portion may be provided in a portion of the second optical connector 12 other than the ferrule 12b. In the embodiment described above, the example in which one second optical connector 12 is mounted on the optical fiber module 10 has been described. However, a plurality of the second optical connectors 12 may be mounted on the optical fiber module 10. In this case, a portion of the plurality of second optical fibers 14 may be connected to one second optical connector 12, and the remaining portion of the plurality of second optical fibers 14 may be connected to the second optical connector 12 different from the second optical connector 12 described above. In this case, the plurality of second optical connectors 12 can be connected to the plurality of internal optical connectors 7.

REFERENCE SIGNS LIST

1: optical device, 2: host device, 3: housing, 3b: side surface, 3c: front surface, 3d: rear surface, 3f: bottom surface, 3g: hole, 4: semiconductor package, 5: optical engine, 6: internal fiber, 7: internal optical connector, 10: optical fiber module, 11: first optical connector, 12: second optical connector, 12b: ferrule, 12c: guide portion, 12d: tip surface, 13: first optical fiber, 14: second optical fiber, 15: light source module, 16: housing, 16b: first surface, 16c: second surface, 16d: third surface, 16f: fourth surface, 16g: fifth surface, 16h: sixth surface, 17: electrical connector, 18: electrical board, 19: indicator lamp, 20: optical fiber module, 25: optical multiplexer/demultiplexer, D1: first direction, D2: second direction, D3: third direction.

The invention claimed is:

1. An optical fiber module attached to and detached from a host device having an optical engine and an internal optical connector optically connected to the optical engine, the optical fiber module comprising:
   a housing having a first surface exposed in a state of being attached to the host device and a second surface facing the first surface;
   at least one first optical connector provided on the first surface;
   a second optical connector provided on the second surface and capable of being optically connected to the internal optical connector;
   a first optical fiber optically connecting the first optical connector and the second optical connector to each other; and
   a light source module supplying light to the optical engine via the second optical connector.

2. The optical fiber module according to claim 1, further comprising an electrical board electrically connected to the host device,
   wherein the light source module receives power from the electrical board and supplies the light.

3. The optical fiber module according to claim 1, further comprising a second optical fiber optically connecting the light source module and the second optical connector to each other.

4. The optical fiber module according to claim 3, wherein the second optical fiber includes at least one polarization maintaining fiber.

5. The optical fiber module according to claim 1, further comprising an optical multiplexer/demultiplexer for multiplexing and demultiplexing the light passing through the first optical fiber.

6. The optical fiber module according to claim 1, wherein the optical fiber module includes a plurality of the first optical connectors.

7. The optical fiber module according to claim 1, wherein the optical fiber module includes a plurality of the second optical connectors.

* * * * *